United States Patent
Trentelman (12)

(10) Patent No.: US 6,279,352 B1
(45) Date of Patent: Aug. 28, 2001

(54) LONG HOT ZONE FURNACE ELEMENT AND OPTICAL FIBER DRAWING METHOD PRACTICED THEREWITH

(75) Inventor: Jackson P. Trentelman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/477,599

(22) Filed: Dec. 30, 1999

(51) Int. Cl.[7] .................................................. C03B 37/02
(52) U.S. Cl. ............................... 65/405; 65/481; 65/502; 65/510; 65/512; 219/552; 219/553; 373/27; 373/117; 373/119; 373/134
(58) Field of Search .............................. 65/121, 145, 283, 65/356, 405, 481, 502, 510, 512; 219/552, 553; 373/27, 117, 119, 134

(56) References Cited

U.S. PATENT DOCUMENTS

| | | | |
|---|---|---|---|
| 1,576,621 | * | 3/1926 | Anderson ............................ 338/217 |
| 1,975,410 | * | 10/1934 | Simpson ............................. 373/134 |
| 2,596,327 | * | 5/1952 | Cox et al. ........................... 392/485 |
| 3,506,771 | * | 4/1970 | Cole ................................... 373/134 |
| 4,101,305 | | 7/1978 | Midwinter et al. .................... 65/145 |
| 4,118,212 | | 10/1978 | Aulich et al. ........................... 65/3 |
| 4,145,200 | * | 3/1979 | Yamazaki et al. ..................... 65/405 |
| 4,152,572 | * | 5/1979 | Noda et al. .......................... 219/118 |
| 4,158,695 | * | 6/1979 | Ishizuka et al. ...................... 422/145 |
| 4,197,136 | * | 4/1980 | Inoue et al. .......................... 501/42 |
| 4,217,123 | | 8/1980 | Titchmarsh .............................. 65/3 |
| 4,259,100 | | 3/1981 | Aulich et al. .......................... 65/11 |
| 4,351,659 | * | 9/1982 | Beales et al. ........................ 65/405 |
| 4,385,916 | | 5/1983 | Jochem et al. ....................... 65/3.13 |
| 4,897,100 | | 1/1990 | Nice .................................. 65/3.13 |
| 5,106,400 | | 4/1992 | Tick ................................... 65/3.11 |
| 5,879,426 | | 3/1999 | Sanghera et al. ..................... 65/405 |
| 5,900,036 | * | 5/1999 | Mossadegh et al. ................... 65/384 |
| 6,010,787 | * | 1/2000 | Yamaguchi et al. .................. 428/373 |

FOREIGN PATENT DOCUMENTS 855393    11/1960   (GB).
99/51537  10/1999   (WO).

OTHER PUBLICATIONS

K. Fujii, "Continuous Fabrication Process of Glass Rod Fibres for Gradient Index Rod Lenses Using Double Pot Crucible", Glass Technology, vol. 39, No. 5, Oct. 1998, pp. 173–178.

John E. Midwinter, "Fiber Pulling by Double–Crucible Apparatus", Optical Fibers for Transmission, ISBN 0–471–60240–X, pp. 166–178 1979 (no month available).

* cited by examiner

*Primary Examiner*—Sean Vincent
(74) *Attorney, Agent, or Firm*—Timothy R. Krogh

(57) ABSTRACT

The disclosed invention is a rotationally symmetrical resistance furnace heating element. The heating element has at least two ends. A respective cooling element is disposed in communication with each end. The heating element includes at least first and second high current density sections. The high current density sections are axially separated by at least one low current density section. The high current density sections have a smaller diameter than the low current density section. The invention also includes a multiple crucible method of drawing an optical fiber from the draw furnace described above. The method includes the step of heating an entire body of raw materials in a hot zone in the furnace.

23 Claims, 3 Drawing Sheets

LONG HOT ZONE FURNACE ELEMENT AND OPTICAL FIBER DRAWING METHOD PRACTICED THEREWITH

BACKGROUND OF THE INVENTION

1. Field of the Invention

The present invention relates generally to multiple crucible methods of drawing fiber, and particularly to a heating element for a draw furnace for heating a plurality raw materials to be drawn through a multiple crucible into an optical fiber.

2. Technical Background

One common multiple crucible method of drawing an optical fiber is the double crucible method. The double crucible method of forming an optical fiber is disclosed in *Optical Fibers for Transmission*, New York, John Wiley, pp. 166–178 (Midwinter, 1979), which is hereby incorporated by reference. Inner and outer crucibles are charged with core and cladding glass raw materials. The core and cladding glass raw materials are heated into a molten state. The molten glass may be drawn into a fiber. For additional background on a double crucible apparatus and this method of drawing an optical fiber, reference is made to U.S. Pat. No. 5,106,400, U.S. Pat. No. 4,729,777, U.S. Pat. No. 4,385,916, and U.S. Pat. No. 4,118,212, which are hereby incorporated herein by reference as though fully set forth in their entirety.

A draw furnace will supply the heat to transform the solid glass into a molten state. The draw furnace has a heating element. Two common types of furnace heating elements are an induction element and a resistance element. Known resistance elements have two ends and a respective thick section adjacent each end. The two thick sections are separated by a thin section. The thin section has the highest current density and is the area where the heat is primarily generated. Graphite is a common choice of material of construction for a resistance heating element.

SUMMARY OF THE INVENTION

One aspect of the present invention is a rotationally symmetrical resistance heating element for a draw furnace. The heating element has at least two ends. Each one of the ends is cooled by a cooling element. The heating element also includes at least first and second high current density sections. The high current density sections are axially separated by at least one low current density section. Each high current density section has a smaller diameter than the low current density section. The current density of the low current density section is less than the current density of each high current density section.

In another aspect, the present invention includes a method of making an optical fiber. The method includes feeding raw materials for making an optical fiber into a multiple crucible apparatus forming a body of raw materials. The method further includes heating the body of raw materials with a furnace having a rotationally symmetrical resistance furnace heating element. The heating element has at least two ends and a cooling element at each end. The heating element further includes at least first and second high current density sections axially separated by at least one low current density section. The high current density sections have a smaller diameter than the low current density section. The current density of the low current density section is less than a current density of each high current density sections. An optical fiber is drawn from the multiple crucible apparatus.

The invention has the advantage that the body of raw materials is maintained at a temperature suitable for melting and a root of the drawn fiber is maintained at a temperature suitable for drawing. Another advantage of the invention is a hot zone of the furnace is extended to the ends of the heating element. The invention also has the advantage of maintaining the raw materials in the hot zone of the furnace and that the hot zone sharply drops off in an area where a root is formed. Additionally, the invention has the advantage of the creation of a specific thermal field in the furnace. The specific thermal field relates to an extended hot zone in a draw furnace that is suitable for use in the drawing of fiber by multiple crucible methods.

An additional advantage is that the furnace heating element allows the maximum use of the length of the furnace for glass fining. Furthermore, the invention has the advantage that it may be adapted for use with existing optical fiber draw equipment. It also may be adapted for use in a continuous furnace as part of a continuous process. The invention includes the further advantage that the residency time of the raw materials in the multiple crucible apparatus is sufficient to fine the raw materials.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
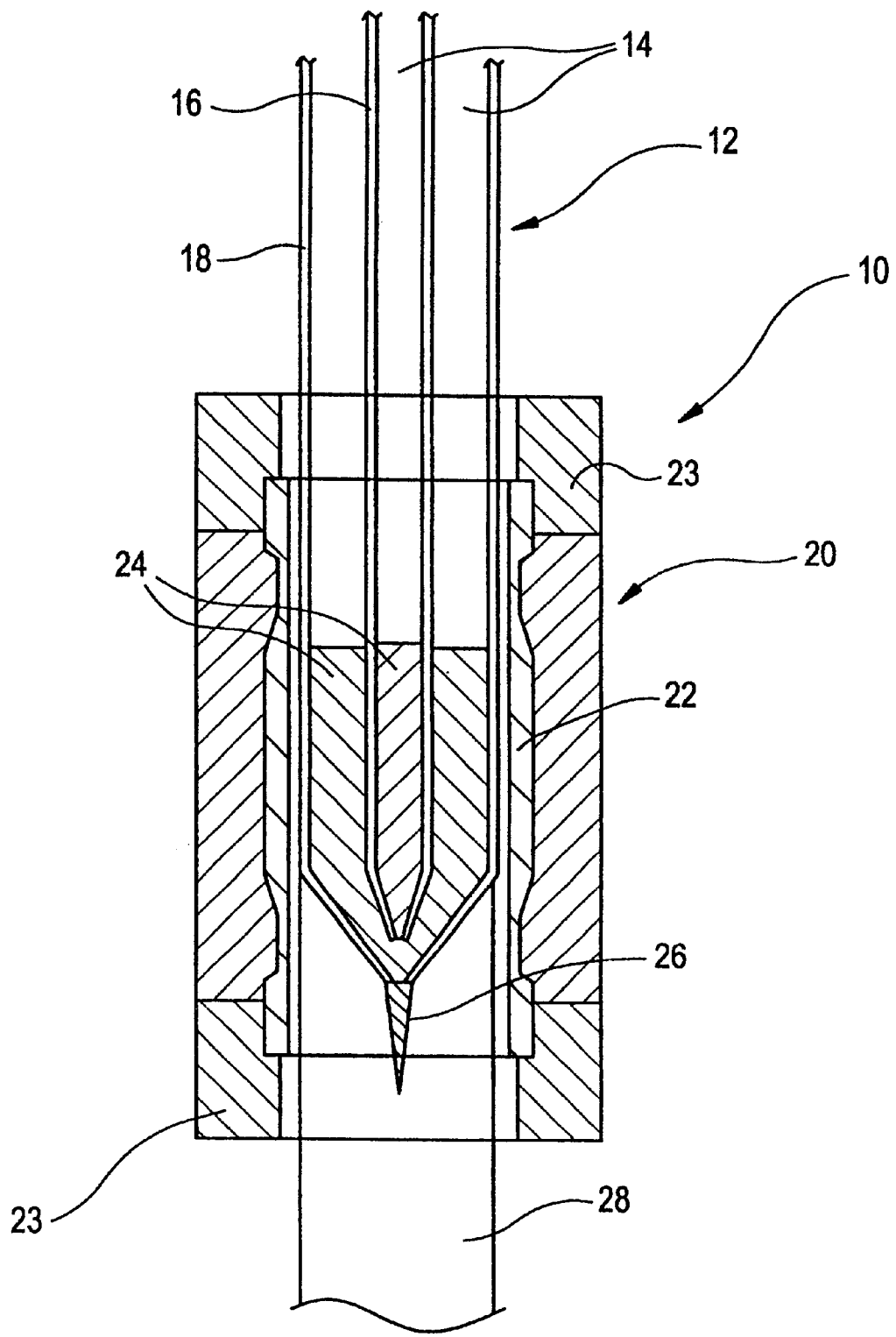
FIG. 1 is a schematic cross sectional view of a furnace for a double crucible optical fiber draw apparatus.

To draw fiber continuously by a multiple crucible technique, it is desirable to subject the crucibles which contain the raw materials to a specific thermal field. It is preferred that the specific thermal field is one in which a body of the raw materials is maintained at a temperature suitable for melting and a root from which the fiber emanates is maintained at a temperature (and viscosity) suitable for drawing a fiber of a desired diameter. The present invention is applicable to any multiple crucible technique for drawing fiber, e.g. double crucible or triple crucible.

In an instance in which devitrification and diffusion are important considerations, the root may need to be several hundred degrees cooler than the body of raw materials in the crucibles. It is also important that the residency time for the raw materials in the crucibles is long enough such that the raw materials may be appropriately fined before drawing of the fiber. The residency time requirement is primarily defined by the pull speed during drawing, the volume of the body of raw materials in the crucibles, and the temperature of the body of raw materials in the crucibles. The term fine is used to describe a body of raw materials that is a homogenous molten mixture and is devoid of air bubbles or other sources of contamination that may cause seeding in the resultant drawn optical fiber.

These constraints dictate a need for a furnace with a specific thermal field that is constant over a length where the body of raw materials resides, then drops off sharply in an area where the root is formed. The area where the thermal field drops off may also be referred to as a boundary area.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the present invention is shown in FIG. 1, and is designated generally throughout by reference numeral 22.

FIG. 1 is a schematic cross sectional view of an apparatus 10 to draw a fiber in accordance with double crucible techniques which incorporates the invention. The apparatus 10 includes a double crucible 12. The double crucible 12 has an inner crucible 16 and an outer crucible 18. The inner crucible 16 is preferably disposed concentrically inside the outer crucible 18.

The raw materials to form a core portion of the resultant optical fiber are fed into the inner crucible 16 at end 14 of apparatus 10. The inner crucible 16 may be constructed of any material with sufficient heat stability to withstand the transformation of the raw materials from a solid to a molten state. The material of construction of the inner crucible 16 should be a material that will not react with the raw materials. An example of a suitable material of construction for the inner crucible is quartz. Alternative suitable types of material of construction of inner crucible 16 include alumina, platinum, and zirconia.

The raw materials to form a cladding portion of an optical fiber are fed into the outer crucible 18 at end 14 of apparatus 10. The outer crucible 18 requires the same physical properties of heat stability and nonreactiveness as the inner crucible 16. Outer crucible 18 is preferably more heat resistant than the inner crucible for at least the reason that outer crucible 18 is located closer to an external heat source than inner crucible 16. The outer crucible 18 may also be constructed from the same material as inner crucible 16.

A preferred choice a raw materials to form an optical fiber are disclosed in patent publication WO 99/51537, published Oct. 14, 1999, which is hereby incorporated herein in its entirety. Alternative core and or cladding raw materials may be pure silica or a doped silica. The silica may be doped with an index of refraction lowering or raising dopant, such as germanium. A person of ordinary skill in the art will realize that numerous materials may be used to form the core or cladding of the fiber depending on the specific optical properties desired. The invention is not limited by the choice of raw materials.

A draw furnace 20 surrounds a portion of the double crucible 12 that includes a body of the raw materials 24. Body 24 consists of both the raw materials to form the core and the cladding of a drawn optical fiber. Preferably, the furnace is a tube furnace. More preferably, the furnace is rotationally symmetric. The draw furnace is the heat source to provide sufficient heat to transform solid raw materials into body 24 of molten raw materials.

The specific operating temperature of the draw furnace 20 will depend on the choice of materials which make up the body of raw materials 24. For example at 1300 to 1500° C. the raw materials disclosed in WO 99/51537 exhibit a viscosity between about $10^2$ to $10^3$ poises. Alternatively, silica will exhibit a similar viscosity at a temperature of about 1700° C. Therefore, it is preferred that draw furnace 20 operates in a temperature range of at least about 1000 to about 2000° C.

Draw furnace 20 shown in FIG. 1 has a heating element 22. The draw furnace should operate at a sufficient temperature such that the raw materials are fined before the raw materials are drawn into an optical fiber. More preferably, the raw materials are fined before the raw materials pass through the midway portion of the body 24.

Preferably the heating element 22 is a resistance element. It has been discovered that a resistance heating element is preferred due to its quick thermal response, its flexibility, and its simplicity. It is more preferably that the heating element is a graphite resistance heating element.

A cooling element 23 is attached to each end of the furnace element 22. Cooling element 23 will be discussed in greater detail in FIG. 5.

A root 26 is extending from the body of raw materials 24. Preferably, a portion of the root 26 extends vertically downward beyond the heating element 22. In the case of drawing the raw materials disclosed in WO 99/51537, it is preferred that the root has a viscosity of $10^4$ to $10^5$ poises. Optionally, the apparatus 10 has a muffle 28. Muffle 28 will reduce the air turbulence in the area of root 26 and stabilize the diameter of the drawn fiber.

Figure 2:
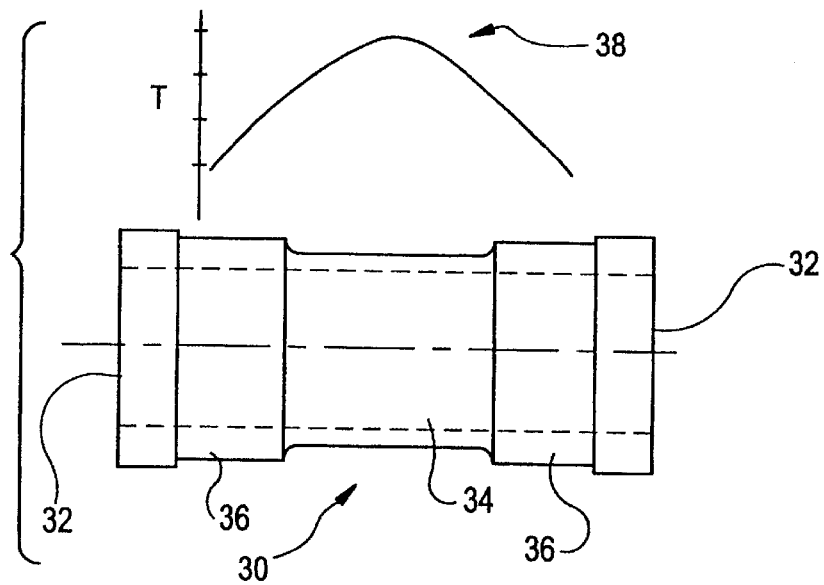
FIG. 2 is a side view of a conventional draw furnace heating element and the temperature profile for the conventional furnace.
Figure 3A:
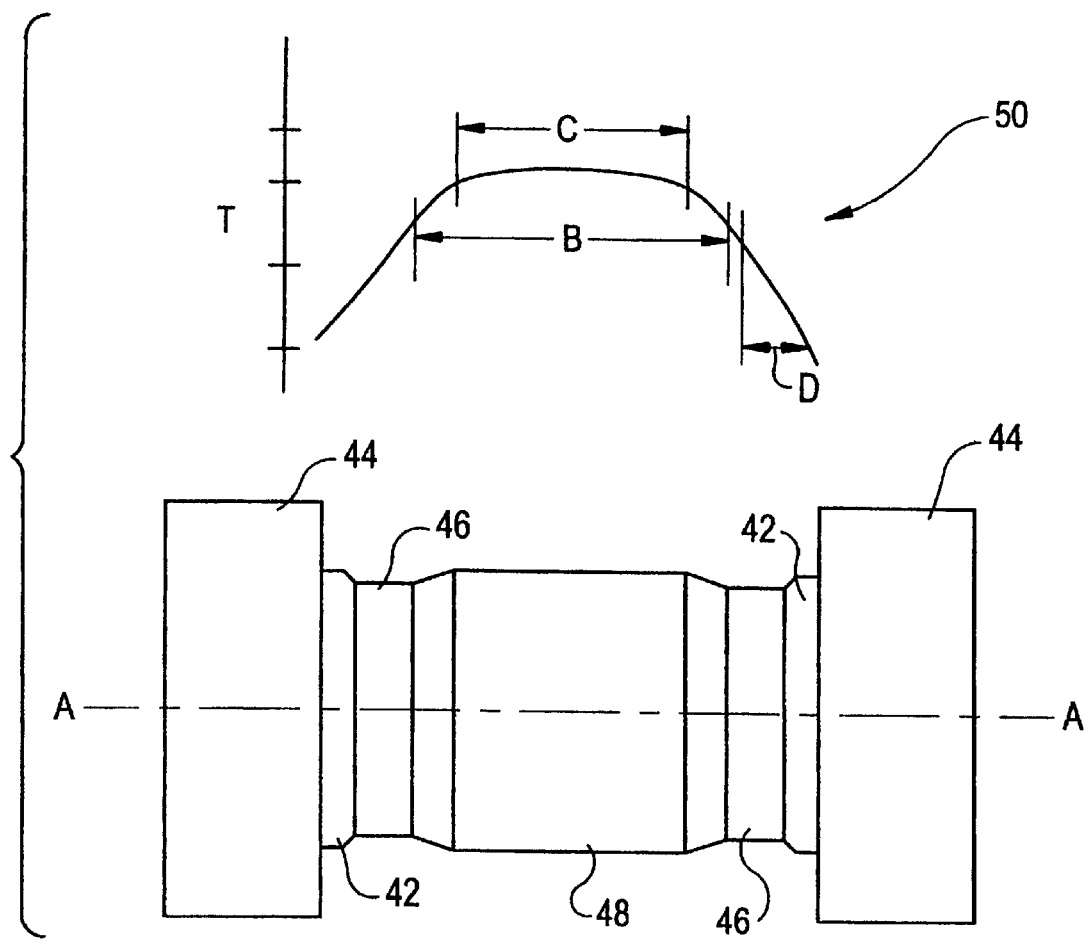
FIG. 3A is a side view of a draw furnace heating element made in accordance with the invention and the temperature profile for the inventive draw furnace.

The draw furnace heating element of the invention and the prior art will be further explained in FIGS. 2 and 3A. Depicted in FIG. 2 is a standard CenTorr furnace heating element 30, available from Vacuum Industries of Nashua, N.H. The furnace heating element 30 is generally cylindrical with two ends 32. Each end 32 has an opening (not shown). One opening is an entrance and the second opening is an exit. A cooling element (not shown) is disposed adjacent each end 32. Each end 32 is water cooled by the respective cooling element (not shown). Heat is generated along a thin center 34 of the element 30. The heal then redistributes itself along two thick sections 36 of the element 30 by radiant heat exchange until an equilibrium is achieved.

The element 30 exhibits the heating profile 38 when in operation. The element 30 has a relatively short hot zone, which corresponds to a high current density section 34 of furnace 30. It is believed that one reason for the element 30 having a short hot zone is that section 34 is disposed in the center of element 30. As the heat generated radiates toward the ends 32, the affects of the cooling elements emanate toward section 36. These divergent forces result in the hot zone shown in heating profile 38.

The draw furnace heating element 40 of the invention is illustrated in FIG. 3A. The heating element 40 is a rotationally symmetrical resistance tube furnace element. Element 40 has at least two ends 42 and a cooling element at each end 44. The cooling element 44 will be discussed in greater detail in relation to FIG. 5. Element 40 includes at least first and second high current density sections 46. The high current density sections may also be referred to as thin sections. The thin sections are axially separated by at least one low current density section 48. Section 48 may also be referred to as a thick section. One of the high current density (thin) sections 46 is disposed as close as possible to a first end and the second current high density (thin) section 46 is disposed as close as possible to a second end. It is preferred that each thin section is the same length (length is defined as the axial direction of the heating element). However, this is not required to practice the invention. In an alternate embodiment (not shown), the thin sections may differ in length.

It also preferred that the thin sections have a smaller diameter than thick section 48. It is further preferred that the diameter is an external diameter. It is additionally preferred that the current density of thick section 48 is less than the current density of each thin section 46.

A hot zone is disposed along an entire length of the furnace between the first and second thin sections. The hot zone is formed by the heat generated at each thin section and the radiant exchange of the heat along the length of the furnace between the thin sections. A reason for the heat being generated primarily at each thin section is that the resistance at each thin section is greater than the resistance at the thick section. Preferably, the entire body of raw materials 24 (FIG. 1) is disposed along the hot zone. The invention may be used to extend the hot zone of any tube furnace heated with a resistance element.

The hot zone of the draw furnace element 40 has a flat profile as illustrated by 50. By flat it is meant that element 40 exhibits a more uniform temperature distribution over a greater length. For example in one preferred embodiment of the heating element the temperature profile will vary ±25° C. over a length of about 3 inches, which represents the distance between thin sections 46, reference character B. In a more preferred embodiment, the temperature profile will ±10° C. over a length of 2 inches, which represents the length of thick section 48, reference character C.

It is preferred that the hot zone of the furnace element 40 is measured by a thermal couple immersed along the axis A of the element 40. The thermocouple is measuring the ambient temperature along axis A along the entire length of the element. This is also true of the heat profile 38 of FIG. 2. One advantage of measuring along axis A is that this a good indicator of the amount of heat that would be transmitted toward a body of raw materials disposed inside element 40. A person of ordinary skill in the art will realize that the actual temperature in the body of materials may different than the ambient measurements for at least the reason of the different thermal properties of ambient air and the fiber raw materials.

The element 40 has the advantage of heat radiating toward the thick section 48 without the cooling elements 44 also emanating a cooling effect on the thick section 48. Therefore, the heat profile 50 has a recognizable plateau and a steep slope as the temperature decreases. This heat profile with a plateau may also be referred to as a flat heat profile.

Preferably, the element 40 is graphite. However the invention is not limited to graphite, any suitable material may be used to practice the invention. It is also preferred that each thin section 46 has a minimum thickness of at least 2 mm. It is more preferred that the thickness of each thin section 46 is no more than 3 mm. With respect to thick section 48, it is preferred that each thick section 48 has a thickness of at least 4 mm. More preferably, each thick section 48 has a thickness of at least 6 mm. Preferably the element is forcibly cooled at each end.

In a preferred embodiment, thick section 48 is at least 0.5 mm thicker than thin sections 46, more preferred thick section 48 is at least 1 mm thicker than thin sections 46, and most preferred thick section 48 is more than 1 mm thicker than thin sections 46.

In a preferred embodiment, the external surface of element 40 is insulated and no heat will emanate from an external surface of element 40.

Figure 3B:
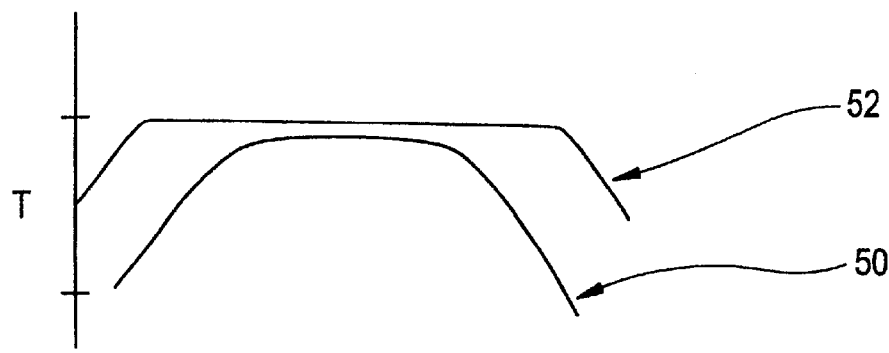
FIG. 3B is graph of the temperature profile of embodiment in FIG. 3A and the temperature profile of the wall of the embodiment shown in FIG. 3A.

FIG. 3B is a graph of the temperature profile 52 of a wall of element 40 in relation to the temperature profile 50. FIG. 3B illustrates the self leveling nature of radiation within a cavity operating at high temperature. In FIG. 3B, the maximum temperature of the wall is the temperature generated at each high current density section. The heat generated at each high current density section radiates along the wall such that the low current density section will have the same temperature as the high current density sections.

Figure 4:
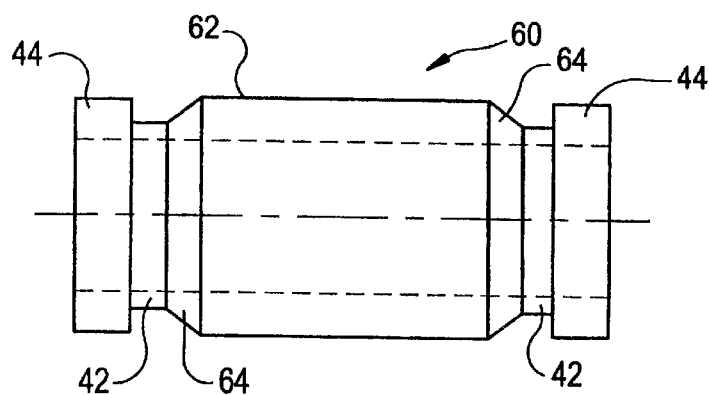
FIG. 4 is a side view of an alternate embodiment of a draw furnace heating element made in accordance with the invention.

In an alternate embodiment of the invention, as embodied herein and as shown in FIG. 4, is depicted with reference numeral 60. The furnace heating element 60 has a thick section 62 that extends from the first and second thin sections 64. The thick section 62 is cylindrical and not tapered. The thin sections 64 are tapered. The larger opening of each tapered thin section 64 is attached to the thick section 62. The smaller opening of each tapered thin section 64 is disposed adjacent one of the ends 42. Each cooling element 44 is disposed adjacent an end 42. It is presumed that this would lengthen the flat plateau of the heating profile.

Figure 5:
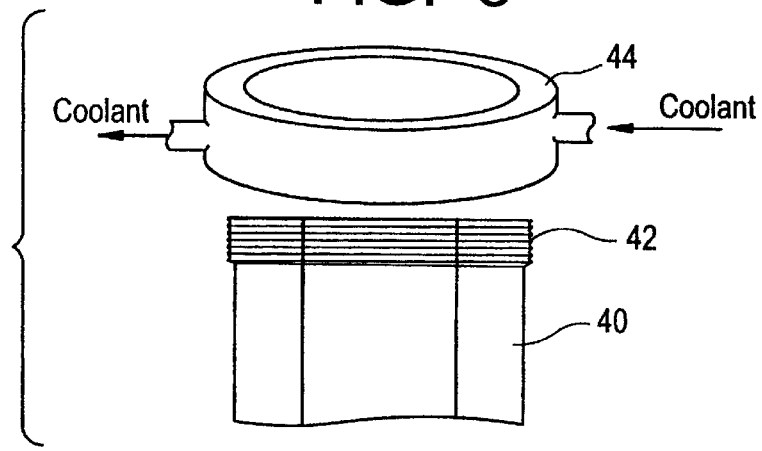
FIG. 5 is a partial perspective view of a cooling element and a heating element in accordance with the invention.

FIG. 5 illustrates the relationship between a preferred cooling element 44 and heating element 40. In a preferred embodiment, each respective end 42 of heating element 40 is threaded, as shown. Cooling element 44 has a complementary thread configuration (not shown) and is secured to heating element 40. A coolant is circulated in an internal chamber of cooling element 44 to cool heating element 40. The coolant is preferably water, however, any type of heat transfer medium may be used, e.g. air, anti-freeze, etc. The choice of medium is not a limiting factor of the invention. In an alternate embodiment, the cooling element may be an integral part of heating element 40. Also, the cooling element 44 may be disposed in communication with the heating element 40 by any known technique. One example of an alternate known technique is that the cooling element may be welded to an end of the heating element.

The furnace heating element of the invention is particularly useful in the production of specialty fibers, preferably specialty fibers constructed from soft glasses.

The present invention also includes a multiple crucible method of drawing optical fibers. The method includes the step of heating the entire body of raw materials in the hot zone of a furnace. The method may also include the optional step of feeding the raw materials into the crucible apparatus at the same mass rate as drawing a fiber from the apparatus.

Alternatively, the method may also include the step of disposing a portion of a root along a portion of the furnace that includes the heating element. In relation to FIG. 3, the portion of the root should be disposed along a portion of the element 40 that correlates to section "D" of the profile 50. It is also preferred that the root has a second portion that extends from element 40.

The method, preferably, also includes the step of fining the raw materials as the raw materials pass midway through an inner crucible or an outer crucible of the multiple crucible apparatus.

The invention also includes a method of making an optical fiber. This method is applicable to any multiple crucible drawing operation, such as double crucible or 3 or more crucible operation. The method includes feeding raw materials for making an optical fiber into a multiple crucible apparatus forming a body of raw materials. The raw materials for forming a core are feed into an inner most crucible. The raw materials for forming a cladding are feed into an outer most crucible. The body of raw materials is heated in a furnace having the aforementioned heating element. An optical fiber is drawn from the above mentioned multiple crucible apparatus. It is preferred that during the drawing step a root is drawn from the multiple crucible apparatus at a lower temperature than a temperature of the body of raw materials. Optionally the method may include the step of fining the body of raw materials prior to said drawing.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A rotationally symmetrical resistance furnace heating element having at least two ends comprising:
    at least first and second high current density sections axially separated by at least one low current density section, said high current density sections having a smaller diameter than said low current density section, and a current density of said low current density section is less than a current density of each high current density sections; and
    a cooling element containing a circulating coolant at each end of said heating element.

2. The heating element of claim 1 wherein said diameter of each section is an external diameter.

3. The heating element of claim 1 wherein said first high current density section is disposed adjacent a first end of the element and said second high current density section is disposed adjacent a second end of the element.

4. The heating element of claim 1 further comprising a hot zone disposed along an entire length of the heating element between said first and second high current density sections.

5. The heating element of claim 4 wherein heat is transferred along said hot zone by radiant heat exchange.

6. The heating element of claim 4 wherein said hot zone has a substantially flat temperature profile.

7. The heating element of claim 4 wherein said hot zone is of a preselected temperature range and preselected size to fine a plurality of raw materials.

8. The heating element of claim 7 wherein said hot zone operates in a temperature range of about 1000 to about 2000° C.

9. The heating element of claim 1 wherein the element is made of graphite.

10. The heating element of claim 1 wherein each high density current section is at least about 2 mm thick.

11. The heating element of claim 10 wherein said thickness of each high current density section is no more than about 3 mm.

12. The heating element of claim 1 wherein each low current density section has a thickness of at least about 4 mm.

13. The heating element of claim 12 wherein said thickness of each low current density section is at least about 6 mm.

14. The heating element of claim 1 wherein said low current density section extends from said first high current density section to said second high current density section.

15. The heating element of claim 14 wherein each high current density section is tapered.

16. The heating element of claim 15 wherein each tapered high current density section is tapered away from said low current density section.

17. A rotationally symmetrical resistance furnace heating element having at least two ends and a cooling element at each end, said heating element comprising:
    at least first and second high current density sections axially separated by at least one low current density section, each of said high density sections has a thickness of no more than 3 mm, said low density section has a thickness of at least 4 mm, said high current density sections having a smaller diameter than said low current density section, and a current density of said low current density section is less than a current density of each high current density sections; said cooling elements each containing a circulating coolant.

18. A method of making an optical fiber comprising:
    feeding raw materials for making an optical fiber into a multiple crucible apparatus forming a body of raw materials;
    heating the body of raw materials with a furnace having a rotationally symmetrical resistance furnace heating element, the heating element having at least two ends and a cooling element at each end, the heating element comprises at least first and second high current density sections axially separated by at least one low current density section, the high current density sections having a smaller diameter than the low current density section, and a current density of the low current density section is less than a current density of each high current density sections;
    cooling each of the two ends of the heating element by circulating a coolant within each of the cooling elements; and
    drawing an optical fiber from the multiple crucible apparatus.

19. The method according to claim 18 further comprising fining the body of raw materials prior to said drawing.

20. The method according to claim 18 wherein during said drawing a root is drawn from the multiple crucible apparatus at a lower temperature than a temperature of the body of raw materials.

21. The heating element of claim 4 wherein said hot zone exhibits a change in temperature of no more than about 10° C.

22. The heating element of claim 4 wherein said hot zone exhibits a change in temperature of no more than about 25° C.

23. A rotationally symmetrical resistance furnace heating element having at least two ends said heating element comprising:
    at least first and second high current density sections axially separated by at least one low current density section, said high current density sections having a smaller diameter than said low current density section, and a current density of said low current density section is less than a current density of each high current density sections; and
    a cooling element containing a circulating coolant wherein the coolant is water at each one of the two ends of the resistance furnace heating element.

* * * * *